(12) United States Patent
Ito et al.

(10) Patent No.: US 10,518,798 B2
(45) Date of Patent: Dec. 31, 2019

(54) STEERING DEVICE

(71) Applicant: YAMADA MANUFACTURING CO., LTD., Kiryu-shi (JP)

(72) Inventors: Toru Ito, Kiryu (JP); Mami Tokizaki, Kiryu (JP); Kazuya Akaishi, Kiryu (JP); Yasushi Yokokura, Kiryu (JP); Koji Hirooka, Kiryu (JP); Ryosuke Takahashi, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 126 days.

(21) Appl. No.: 15/716,351

(22) Filed: Sep. 26, 2017

(65) Prior Publication Data

US 2018/0099688 A1 Apr. 12, 2018

(30) Foreign Application Priority Data

Oct. 7, 2016 (JP) .................................. 2016-199026
Aug. 31, 2017 (JP) .................................. 2017-167053

(51) Int. Cl.
*B62D 1/19* (2006.01)
*B62D 1/184* (2006.01)

(52) U.S. Cl.
CPC ............. *B62D 1/192* (2013.01); *B62D 1/184* (2013.01)

(58) Field of Classification Search
CPC .................................. B62D 1/192; B62D 1/184
See application file for complete search history.

(56) References Cited

U.S. PATENT DOCUMENTS

| 3,600,971 | A | * | 8/1971 | Scarvelis | B62D 1/192 74/492 |
| 4,563,912 | A | * | 1/1986 | Parks | B62D 1/185 403/351 |
| 5,669,633 | A | * | 9/1997 | Naff | B62D 1/192 188/376 |
| 6,039,350 | A | * | 3/2000 | Patzelt | B62D 1/184 280/775 |
| 2005/0104353 | A1 | * | 5/2005 | Ikeda | B62D 1/184 280/775 |
| 2005/0247532 | A1 | * | 11/2005 | Grams | B62D 1/192 188/371 |
| 2009/0256342 | A1 | * | 10/2009 | Cymbal | B62D 1/192 280/777 |
| 2010/0018340 | A1 | * | 1/2010 | Schnitzer | B62D 1/192 74/493 |

FOREIGN PATENT DOCUMENTS

| JP | 2003-261037 A | | 9/2003 |
| JP | 2009208506 A | * | 9/2009 |
| JP | 2014151714 A | * | 8/2014 |

* cited by examiner

*Primary Examiner* — Darlene P Condra
(74) *Attorney, Agent, or Firm* — McGinn IP Law Group, PLLC (57) ABSTRACT

The object of the present invention is realized by providing a steering device having: a column pipe for supporting a shaft; an outer column; a fixing bracket, and a tightening tool, wherein the outer column includes an embracing main body portion that holds the column pipe so that the column pipe can move in a front-rear direction, and clamp portions for widening and narrowing a slit formed in the embracing main body portion in a width direction, and an inner peripheral recessed portion is formed on an inner peripheral side of the embracing main body portion opposite the slit so as to extend from a rear end of the embracing main body.

13 Claims, 8 Drawing Sheets

Fig.2A  FRONT SIDE / REAR SIDE

Fig.2B  Y2-Y2 ARROW VIEW

STEERING DEVICE

BACKGROUND OF THE INVENTION

1. Field of the Invention

The present invention relates to a steering device having a function for absorbing impact energy generated during a secondary collision.

2. Description of the Related Art

A conventional steering device fixed to a vehicle body absorbs impact energy generated during a secondary collision by partially moving in a forward direction during the secondary collision. The technology disclosed in Japanese Patent Application Publication No. 2003-261037 is available as prior art relating to this type of steering device.

The steering device described in Japanese Patent Application Publication No. 2003-261037 includes an outer jacket 10 disposed in a rear portion, an inner jacket 11 disposed in a front portion, a lower bracket 13 fixed to a front portion of the inner jacket 11 via a housing 12, and an upper bracket 14 fixed to the outer jacket 10. The outer jacket 10 and the inner jacket 11 are fitted to each other to be capable of sliding relative to each other in an axial direction.

During a secondary collision, the outer jacket 10 and the inner jacket 11 slide relative to each other in the axial direction such that an impact is absorbed using friction generated between the two jackets 10, 11. Further, a stay 61 that extends from the upper bracket 14 and is engaged indirectly to the inner jacket 11, and a shaft 62 that is provided on the inner jacket 11 and engaged to an elongated hole 64 formed in the stay 61 are provided as a pair of guiding members for guiding the outer jacket 10 and the inner jacket 11 in a relative sliding direction during a secondary collision. By having the stay 61 guide the relative movement between the outer jacket 10 and the inner jacket 11, twisting is suppressed during the secondary collision.

SUMMARY OF THE INVENTION

In Japanese Patent Application Publication No. 2003-261037, the stay 61, which is formed integrally with the upper bracket 14 so as to extend therefrom, and the shaft 62 are provided, leading to an increase in the number of components and a corresponding increase in cost. Moreover, an amount of required space increases, leading to a reduction in mountability. An object of the present invention is therefore to provide a steering device in which an outer column and a column pipe can execute an impact absorption stroke smoothly by means of a simple configuration.

Hence, a first aspect of the present invention solves the problems described above by providing a steering device including: a column pipe for supporting a shaft; an outer column; a fixing bracket; and a tightening tool, wherein the outer column includes an embracing main body portion that holds the column pipe so that the column pipe can move in a front-rear direction, and clamp portions for widening and narrowing a slit formed in the embracing main body portion in a width direction; the fixing bracket includes fixing side portions that clamp respective width direction sides of the outer column; the tightening tool includes a clamping bolt and a clamping lever, the clamping bolt being inserted into a tightening hole formed in each of the clamp portions of the outer column and a support hole formed in each of the fixing side portions so that tightening and release can be performed freely using the clamping lever; and an inner peripheral recessed portion is formed on an inner peripheral side of the embracing main body portion opposite the slit so as to extend from a rear end of the embracing main body.

Further, a second aspect of the present invention solves the problems described above by providing the steering device according to the first aspect, wherein the inner peripheral recessed portion is formed to the rear of respective rear ends of the clamp portions, and a rear end of the inner peripheral recessed portion is formed to be wider than a front end thereof. A third aspect of the present invention solves the problems described above by providing the steering device according to the first or second aspect, wherein a contour line forming a boundary between an inner surface of the embracing main body portion and the inner peripheral recessed portion is formed as a curve.

A fourth aspect of the present invention solves the problems described above by providing the steering device according to the first or second aspect, wherein a thickness of the embracing main body portion within a region of the inner peripheral recessed portion is set to decrease gradually from a front side toward a rear side. A fifth aspect of the present invention solves the problems described above by providing the steering device according to the first or second aspect, wherein the inner peripheral recessed portion is formed to extend from an axial direction rear end of the outer column to an intermediate location.

A sixth aspect of the present invention solves the problems described above by providing the steering device according to the first or second aspect, wherein the inner peripheral recessed portion is formed to extend fully along an axial direction of the outer column from a rear end to a front end. A seventh aspect of the present invention solves the problems described above by providing the steering device according to the first or second aspect, wherein a connecting portion that connects respective ends of the slit portion is formed on a front side of the slit portion, and an escape portion is formed on an inner peripheral side of the connecting portion.

In the steering device according to the present invention, when twisting occurs during a secondary collision, the column pipe deflects so as to be pressed forcefully against an upper rear side of the inner peripheral surface of the embracing main body portion. In the present invention, the inner peripheral recessed portion is formed on the upper side of the inner peripheral surface of the embracing main body portion, and therefore, even when twisting occurs during a secondary collision, stress concentrated on the upper side of the inner peripheral surface of the outer column is dispersed to the periphery such that the outer column and the column pipe can move forward smoothly.

BRIEF DESCRIPTION OF THE DRAWINGS

FIGS. 3A and 3B are views showing a second embodiment of the steering device according to the present invention, wherein

FIGS. 4A to 4D are views showing a third embodiment of the steering device according to the present invention, wherein

DESCRIPTION OF THE PREFERRED EMBODIMENTS

A steering device according to the present invention includes a column pipe 1 for supporting a shaft 12, an outer column 2, a fixing bracket 3, and a tightening tool 4. Hereafter, a direction of the shaft 12 within the outer column 2 will be referred to as an axial direction, and an orientation of the shaft 12, or in other words a side on which a steering wheel 121 is mounted, will be referred to as the rear. Further, the opposite side to the rear will be referred to as the front, and a left-right direction from the viewpoint of a passenger gripping the steering wheel 121 will be referred to as a width direction. Furthermore, upward and downward directions from the viewpoint of the passenger will be referred to as is, i.e. as upward and downward.

First Embodiment

Figure 1A:
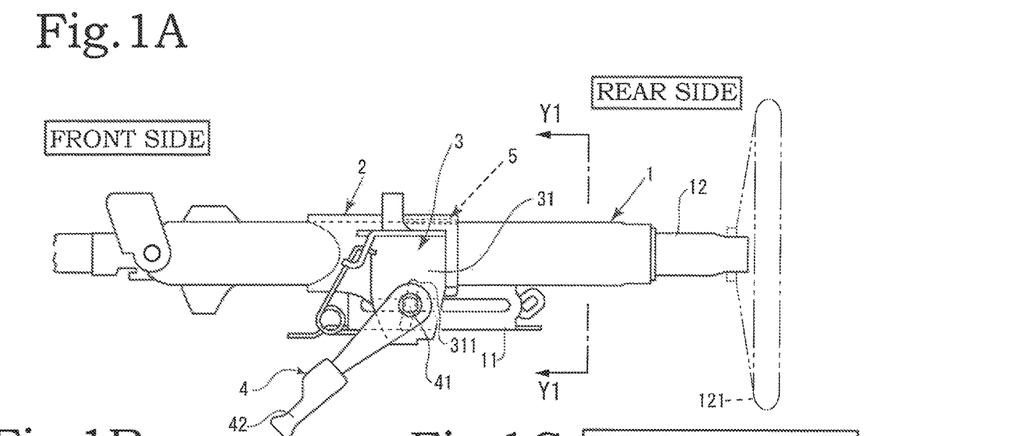
FIG. 1A is a side view of a first embodiment of a steering device according to the present invention.
Figures 1B, 1C, 1D, 1E:
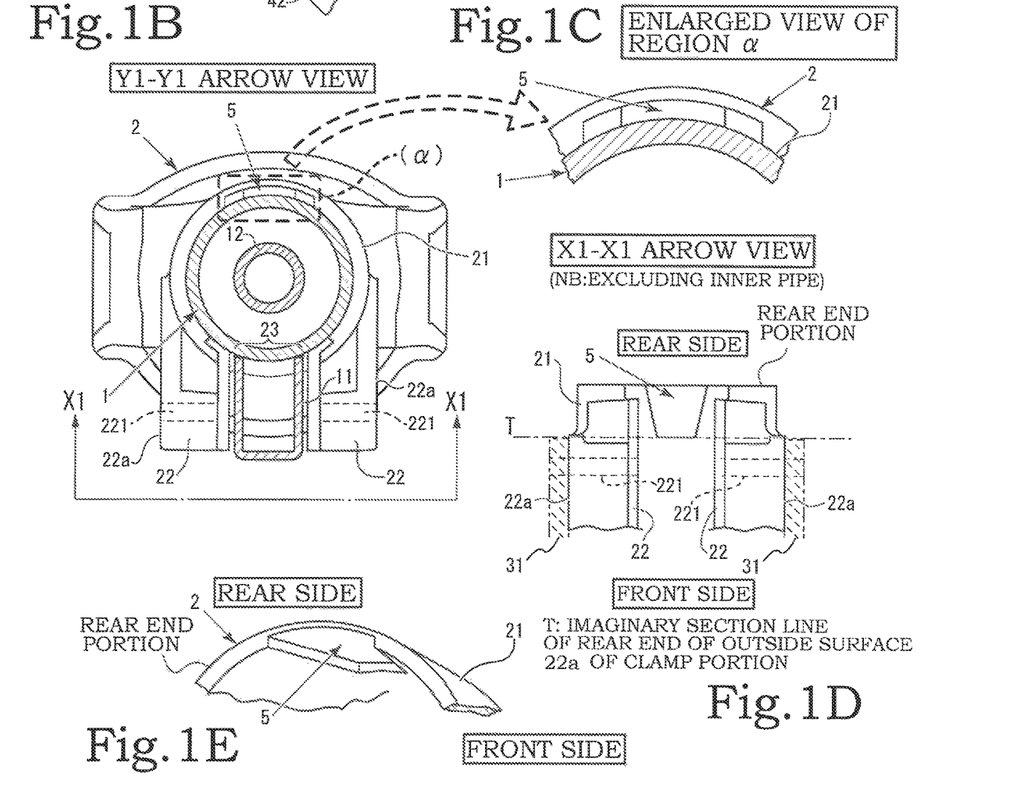
FIG. 1B is a sectional view of an outer column of the steering device, taken along an arrow Y1-Y1.
FIG. 1C is an enlarged view of a region α.
FIG. 1D is a view seen in the direction of an arrow X1-X1 in FIG. 1B.
FIG. 1E is an enlarged perspective view of an inner peripheral recessed portion provided in the outer column.

Referring to FIGS. 1A to 1E, a first embodiment of the steering device according to the present invention will be described. FIG. 1A is a side view of the steering device, on which the left and right sides of the figure respectively correspond to the front and the rear. FIG. 1B is a view seen in the direction of an arrow Y1-Y1, from which the fixing bracket 3 and the tightening tool 4 have been omitted. FIG. 1C is an enlarged view of a region $\alpha$. The steering device includes the column pipe 1 for supporting the shaft 12, the outer column 2, the fixing bracket 3, and the tightening tool 4. The outer column 2 includes an embracing main body portion 21 that holds the column pipe 1 so that the column pipe 1 can move in a front-rear direction. A slit portion 23 is provided in a lower portion of the embracing main body portion 21, and a pair of clamp portions 22 are provided on respective sides thereof. The outer column 2 is formed from aluminum alloy, for example.

The clamp portions 22 are shaped to be left-right symmetrical, and are formed integrally with positions on respective width direction side ends of the slit portion 23. More specifically, the clamp portions 22 are thick plate-shaped parts formed to extend substantially vertically downward from the respective width direction ends of the slit portion 23 or the vicinity thereof. Further, the clamp portions 22 are formed in the shape of blocks, and have plate thicknesses that extend to positions on respective horizontal diametrical direction ends of the embracing main body portion 21. Respective outer surface of the two clamp portions 22 will be referred to as outside surfaces 22a.

The outer column 2 is fixed at the rear thereof to a vehicle body by the fixing bracket 3. The fixing bracket 3 includes a left-right pair of fixing side portions 31, and the clamp portions 22 of the outer column 2 are clamped between the fixing side portions 31. The outside surfaces 22a of the two clamp portions 22 are formed as flat surfaces so that when the clamp portions 22 are clamped between the two fixing side portions 31 of the fixing bracket 3, the fixing side portions 31 can contact the outside surfaces 22a of the clamp portions 22.

The clamp applied by the fixing side portions 31 and the clamp applied by the clamp portions 22 can be tightened and released by manipulating the tightening tool 4. The tightening tool 4 includes a clamping bolt 41 and a clamping lever 42. The clamping bolt 41 is inserted into tightening holes 221 formed in the clamp portions 22 of the outer column 2 and support holes 311 formed in the fixing side portions 31 as elongated holes that are elongated in a vertical direction. When the clamping lever 42 is tightened, an interval between the pair of fixing side portions 31 narrows, and as a result, an interval between the pair of clamp portions 22 also narrows. Accordingly, the embracing main body portion 21 holds the column pipe 1 tightly. A tightening force generated by the fixing side portions 31 acts on the pair of clamp portions 22 via the two outside surfaces 22a.

When the clamping lever 42 is tightened, the column pipe 1 is held by a holding force that is based on a frictional force generated between a front surface of the column pipe 1 and an inside surface of the outer column 2. During a secondary collision, the column pipe 1 moves forward relative to the outer column 2 against this frictional force. At this time, the frictional force serves as a source of an impact absorption load.

Referring to FIGS. 1A to 1E, an inner peripheral recessed portion 5 is formed in the rear of the embracing main body portion 21 of the outer column 2. As shown in FIGS. 1B and 1C, the inner peripheral recessed portion 5 is a concave cutout provided in the inner periphery of the embracing main body portion 21 at the rear thereof above the slit. Further, as is evident from FIGS. 1D and 1E, a width direction dimension of the inner peripheral recessed portion 5 is greatest at a rear end of the embracing main body portion 21, and decreases gradually toward the front. An axial direction formation range of the inner peripheral recessed portion 5 is set to extend rearward from a rear end position of the flat outside surface 22a.

The inner periphery of the outer column 2 and the outer periphery of the column pipe 1 contact each other frontward of the respective rear ends of the clamp portions 22. With this configuration, a contact area between the inner peripheral surface of the embracing main body portion 21 and the column pipe can be maintained. As a result, the tightening force is not impaired by providing the inner peripheral recessed portion 5. Further, the inner peripheral recessed portion 5 may be formed by cutting as well as molding. A line segment T in FIG. 1D represents an imaginary section line of a rear end of the outside surface 22a of the clamp portion 22.

Figure 5A:
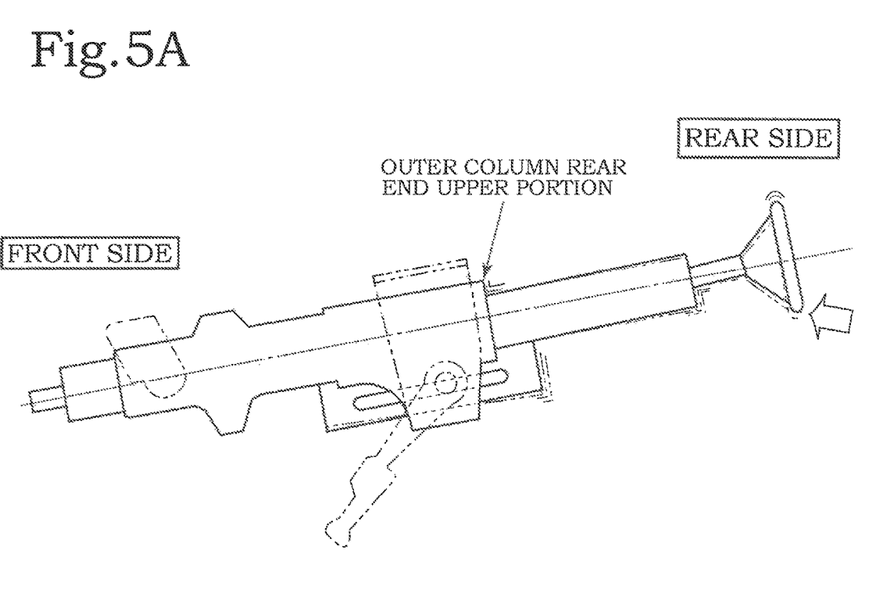
FIG. 5A is a schematic side view showing a conventional steering device when twisting occurs during a secondary collision.
Figure 5B:
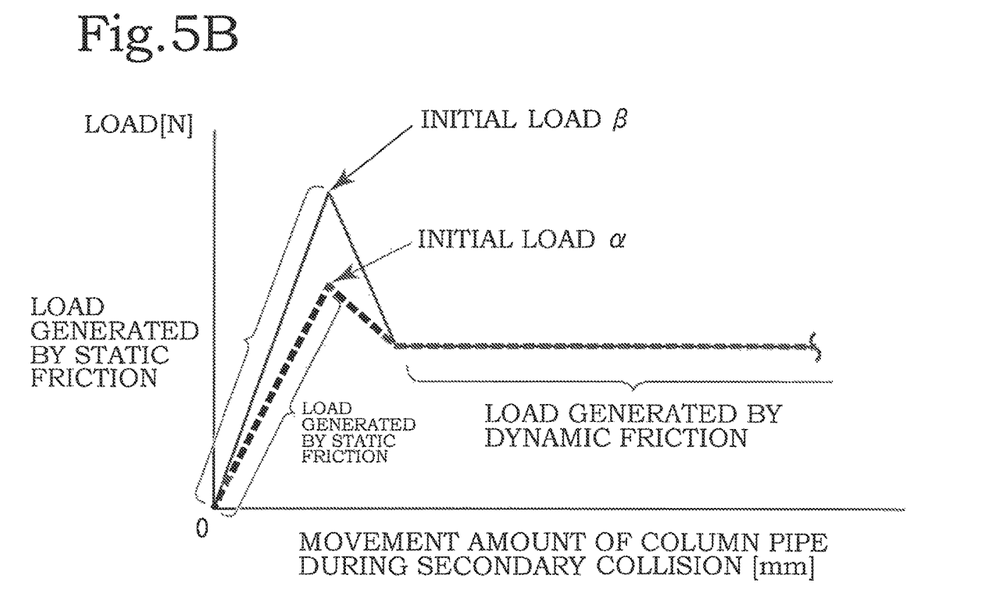
FIG. 5B is a view showing an impact absorption characteristic (a graph of a dotted line having an initial load $\alpha$) exhibited by the steering device according to the present invention during a secondary collision, and a view showing the impact absorption characteristic (a graph of a solid line having an initial load $\beta$) exhibited by the conventional steering device during a secondary collision.

Referring to FIG. 5A, when the column pipe 1 of a conventional steering device not formed with the inner peripheral recessed portion 5 twists during a secondary collision, the column pipe 1 is pressed forcefully against an upper rear side of the inner peripheral surface of the embracing main body portion 21 of the outer column 2. Accordingly, stress is concentrated on the upper side of the inner peripheral surface of the outer column 2 such that an initial load β increases, as shown in FIG. 5B, and as a result, the column pipe 1 may not move smoothly forward.

Figure 2A:
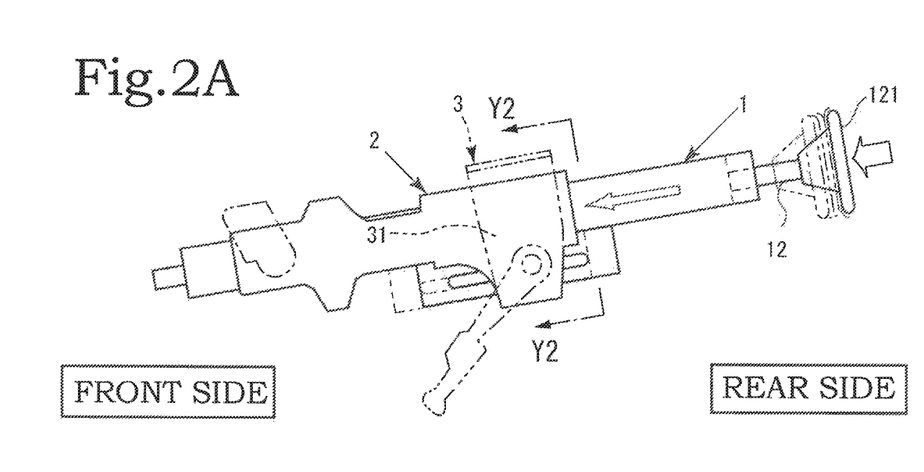
FIG. 2A is a side view showing an operation executed by the steering device according to the present invention during a secondary collision.
Figure 2B:
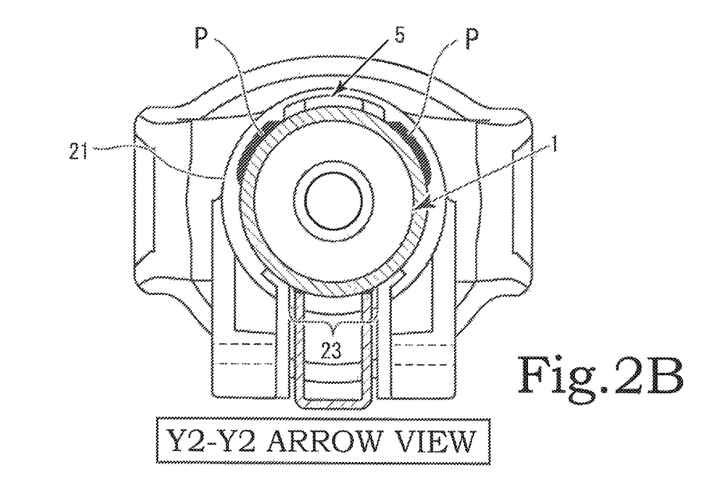
FIG. 2B is a sectional view taken along an arrow Y2-Y2 in FIG. 2A, from which a fixing bracket and a tightening tool have been omitted.

FIGS. 2A and 2B are views showing an operation executed by the first embodiment of the steering device according to the present invention during a secondary collision. When the steering wheel 121 receives a pressing force from the rear of the vehicle body such that twisting occurs, the column pipe 1 deflects so as to forcefully contact the upper rear side of the inner peripheral surface of the embracing main body portion 21. However, the inner peripheral recessed portion 5 is formed in the upper rear side of the inner peripheral surface of the embracing main body portion 21, and therefore, even when the column pipe 1 twists, stress is not concentrated on one point on the upper rear side of the inner peripheral surface of the embracing main body portion 21. Instead, the stress is dispersed over a region on respective width direction sides of the inner peripheral recessed portion 5, this region being indicated by a reference symbol P (see FIG. 2B).

Hence, even when the column pipe 1 twists during a secondary collision, the column pipe 1 can move forward smoothly, without catching on the upper rear side of the inner periphery of the embracing main body portion 21, and as a result, energy can be absorbed appropriately. An energy absorption characteristic exhibited in this case is illustrated on a graph shown in FIG. 5B, on which the low initial load α is indicated by a dotted line.

The inner peripheral recessed portion 5 is structured such that the concave portion thereof is formed in a trapezoidal shape having a width direction dimension that narrows gradually from the rear end to the front end. The reason for this is that by forming the part where stress tends to concentrate during a secondary collision as a concave portion, contact between the outer column 2 and the column pipe 1 can be avoided, and force can be dispersed over the periphery thereof. Further, the inner peripheral recessed portion 5 is formed in a region to the rear of the outside surfaces 22a of the clamp portions 22, which are important for tightening the column pipe 1. According to this configuration, the contact area between the column pipe 1 and the outer column 2 is maintained in the region that is important for tightening, and therefore the tightening force exerted on the column pipe 1 is not impaired.

With the first embodiment of the steering device according to the present invention, as described above, the column pipe 1 can slide smoothly through the outer column 2 even when the column pipe 1 twists during a secondary collision.

Further, the inner peripheral recessed portion 5 is formed in a trapezoidal shape having a width direction dimension that decreases gradually from the rear end toward the front end, and therefore the contact area between the column pipe 1 and the outer column 2 is maintained such that the tightening force applied by the tightening tool 4 is not impaired.

Second Embodiment

Figures 3A, 3B:
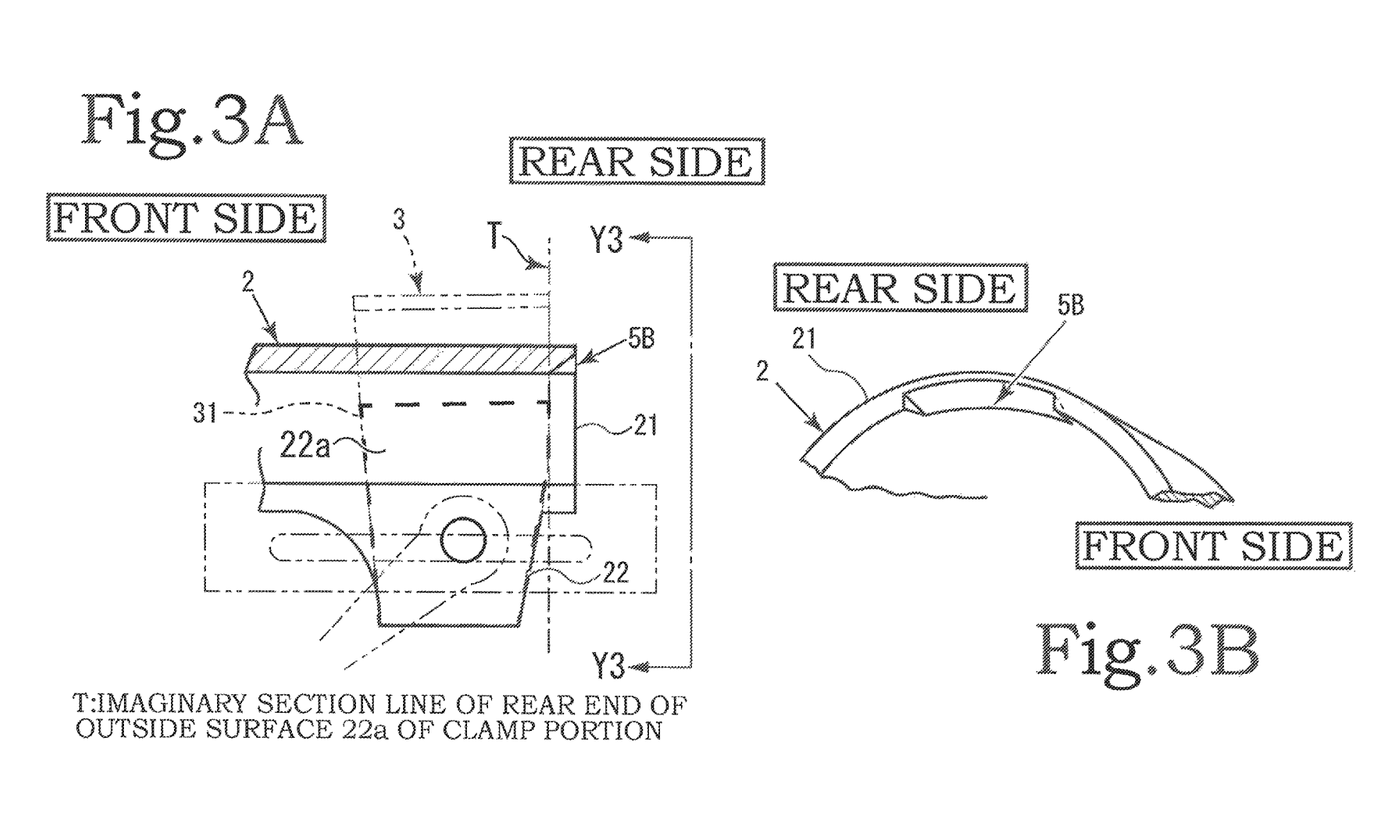
FIG. 3A is a sectional side view showing a rear end portion of the outer column of the steering device.
FIG. 3B is an enlarged perspective view seen from the direction of an arrow Y3-Y3, and specifically an enlarged perspective view of the inner peripheral recessed portion.

Next, a second embodiment of the steering device according to the present invention will be described on the basis of FIGS. 3A and 3B. Apart from the shape of an inner peripheral recessed portion 5B, the steering device is configured identically to the steering device according to the first embodiment. FIG. 3A is a sectional side view showing the rear end of the outer column 2 of the steering device. The column pipe 1, the fixing bracket 3, and the tightening tool 4 have been omitted from FIG. 3A. FIG. 3B is an enlarged perspective view seen in the direction of an arrow Y3-Y3. The inner peripheral recessed portion 5B is formed to have a narrower width at a front end than at a rear end.

Further, a recess surface is inclined from the front end toward the rear end. As a result of this incline, the thickness of the embracing main body portion 21 is lower at the rear end than at the front end. The line segment T shown in FIG. 3A represents the imaginary section line of the rear end of the outside surface 22a on the outer sides of the clamp portions 22. The inner peripheral recessed portion 5B is formed rearward of the line segment T. The thickness of the inner peripheral recessed portion 5B according to the second embodiment is set to decreases gradually from the front end toward the rear end. The reason for this is that even when the inner peripheral recessed portion 5B is provided in the rear end of the embracing main body portion 21, a reduced thickness range remains limited, and therefore the rigidity and tightening force of the embracing main body portion 21 are not affected. Further, the inner peripheral recessed portion 5B according to the second embodiment is formed near the rear end of the outer column 2. In other words, the inner peripheral recessed portion 5B according to the second embodiment is formed in a small region extending from the rear end of the outer column 2 toward the front side.

Third Embodiment

Figure 4A:
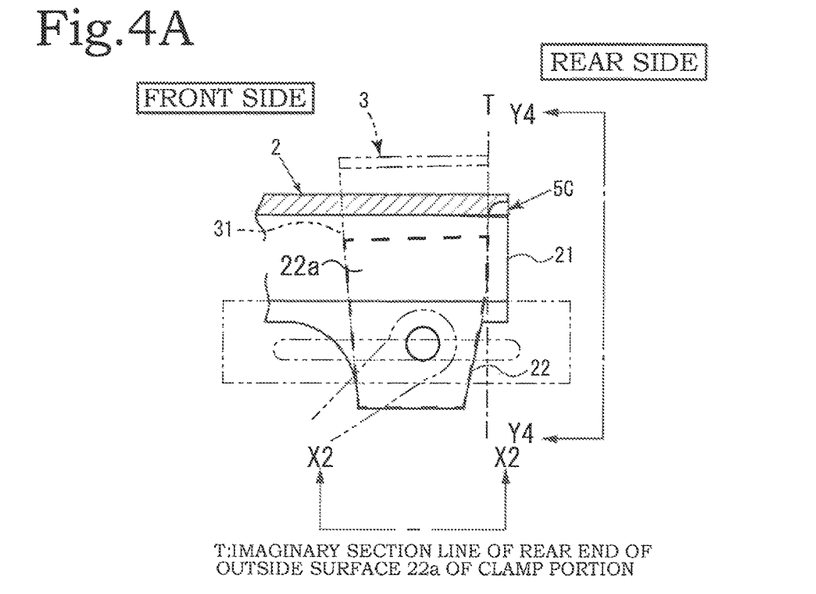
FIG. 4A is a sectional side view showing the rear end portion of the outer column of the steering device.

Next, a third embodiment of the steering device according to the present invention will be described. Apart from the shape of an inner peripheral recessed portion 5C, the steering device is configured identically to the steering device according to the first and second embodiments. The third embodiment will be described below with reference to FIGS. 4A to 4D. FIG. 4A is a side view showing the rear end of the outer column 2 of the steering device. The column pipe 1, the fixing bracket 3, and the tightening tool 4 have been omitted from FIG. 4A.

Figure 4B:
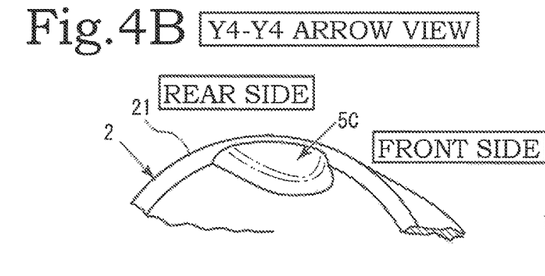
FIG. 4B is an enlarged perspective view seen from the direction of an arrow Y4-Y4.
Figure 4C:
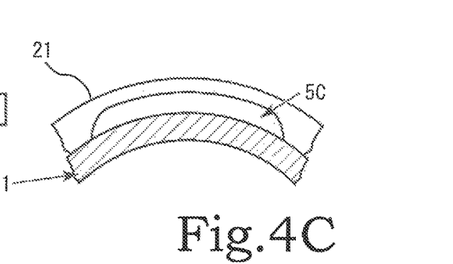
FIG. 4C is an enlarged view of the inner peripheral recessed portion within a sectional view taken along an arrow Y4-Y4.
Figure 4D:
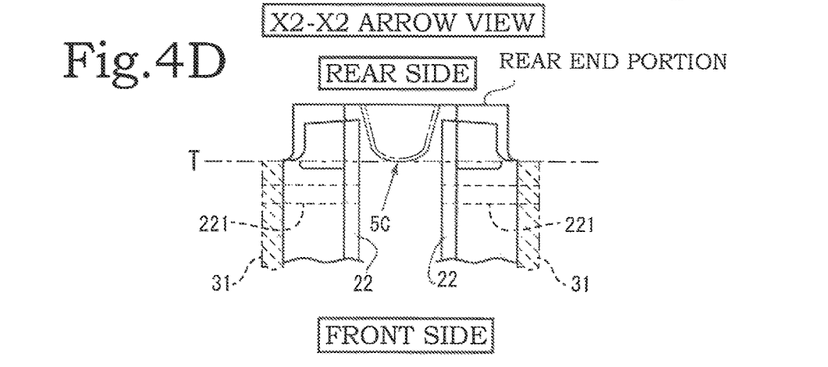
FIG. 4D is a view seen in the direction of an arrow X2-X2.

FIG. 4B is an enlarged perspective view seen in the direction of an arrow Y4-Y4. FIG. 4C is an enlarged view seen in the direction of the arrow Y4-Y4, and FIG. 4D is a view seen in the direction of an arrow X2-X2. The inner peripheral recessed portion 5C is formed such that the width thereof is narrower at the front end than at the rear end. Further, the recess surface is inclined from the front end toward the rear end. As a result of this incline, the thickness of the embracing main body portion 21 is lower at the rear end than at the front end. Furthermore, no corner portions are formed in the interior of the inner peripheral recessed portion 5C. In other words, the inner peripheral recessed portion 5C is formed from curves alone.

As is evident from FIG. 4D, the inner peripheral recessed portion 5C has a bell shape when seen from a direction facing the inner peripheral surface thereof. It is also evident that the inner peripheral recessed portion 5C is provided rearward of the line segment T of the rear end of the outside surface 22a, as shown in FIGS. 4A and 4D. With the third embodiment of the steering device according to this invention, similar effects to the first and second embodiments are obtained. Moreover, since no corner shapes are formed in the recessed portion, the recessed portion can be extracted from a mold more easily.

Fourth Embodiment

Figure 6A:
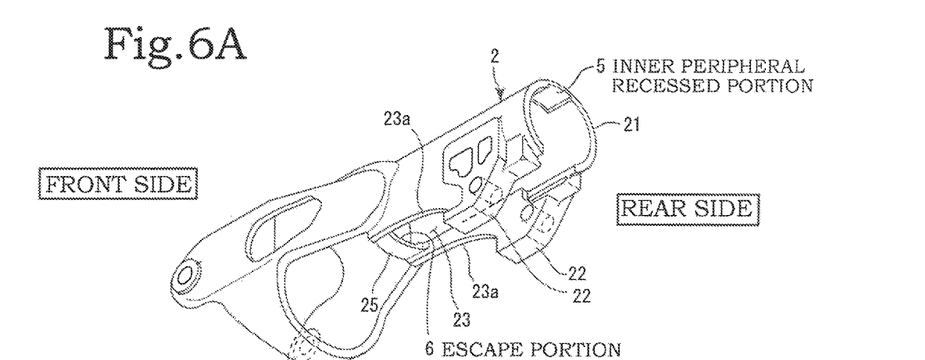
FIG. 6A is a perspective view of the outer column of a fourth embodiment of the steering device according to the present invention.
Figure 6B:
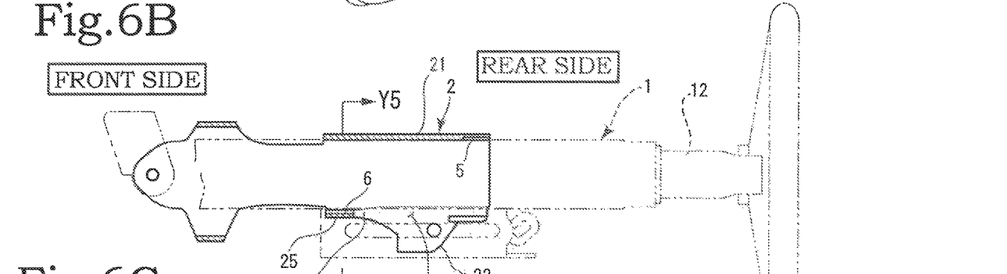
FIG. 6B is a longitudinal sectional side view of the outer column.
Figure 6C:
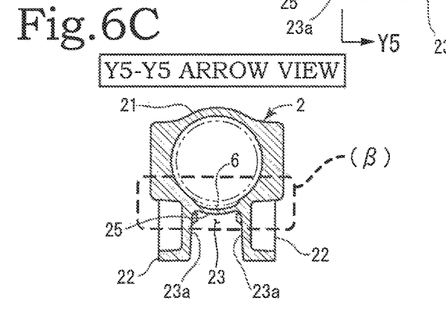
FIG. 6C is a sectional view taken along an arrow Y5-Y5 in FIG. 6B.
Figure 6D:
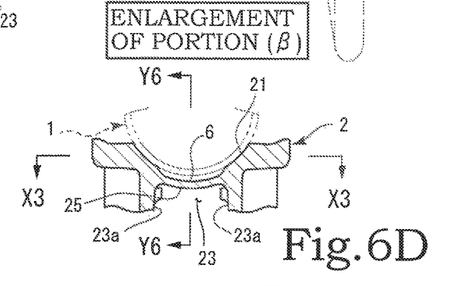
FIG. 6D is an enlarged view of a region $\beta$ in FIG. 6C.

Next, referring to FIGS. 6A to 6F and FIG. 7, a fourth embodiment of the steering device according to the present invention will be described. FIG. 6A is a perspective view of the outer column 2, and FIG. 6B is a longitudinal sectional side view of the outer column 2. As described above, the slit portion 23 is provided in the lower portion of the embracing main body portion 21 of the outer column 2. Further, a connecting portion 25 that connects respective width direction ends 23a of the slit portion 23 in a bridge-like fashion is formed in a location on a front side end portion of the slit portion 23 (see FIGS. 6A, 6C, 6D, and 6F).

Figure 6E:
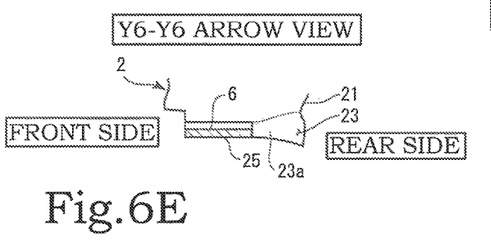
FIG. 6E is a sectional view taken along an arrow Y6-Y6 in FIG. 6D.
Figure 6F:
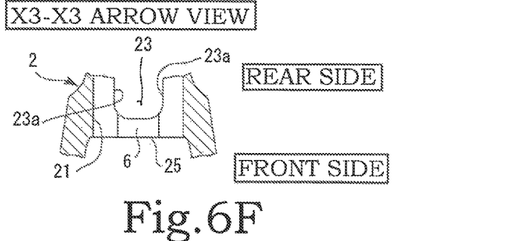
FIG. 6F is a sectional view taken along an arrow X3-X3 in FIG. 6D.

The connecting portion 25 is formed substantially in an arc shape around the circumferential inner peripheral surface of the embracing main body portion 21. An escape portion 6 is formed in the connecting portion 25 (see FIGS. 6A to 6F). The escape portion 6 is a site on the inner peripheral side of the connecting portion 25 that does not contact the column pipe 1, and is formed in the shape of a wide, shallow groove on the inner peripheral side of the connecting portion 25 (see FIG. 6D). The shallow groove-shaped escape portion 6 is formed to extend fully over the entire connecting portion 25 in the front-rear direction thereof (see FIGS. 6E and 6F).

Figure 7:
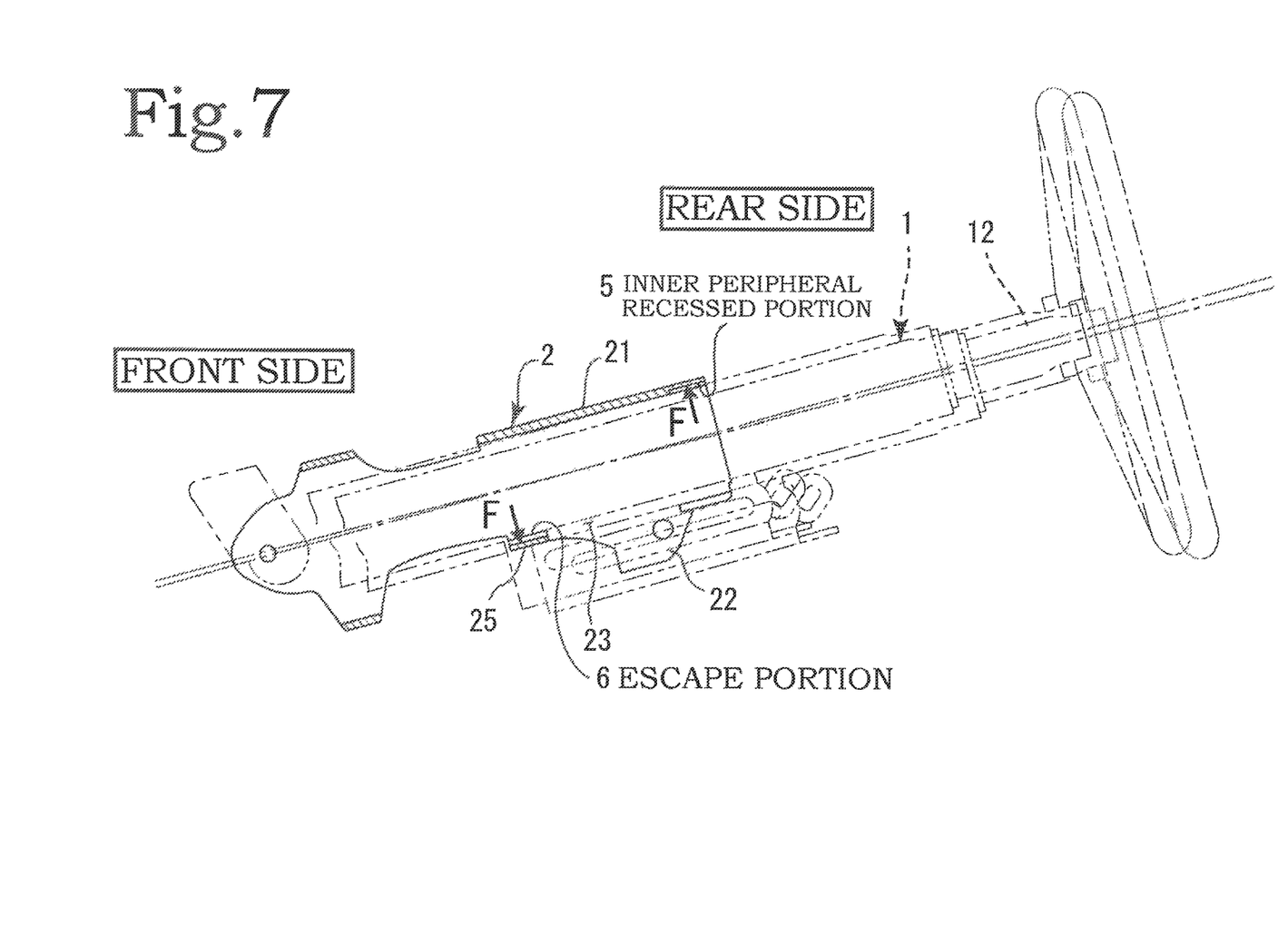
FIG. 7 is a side view showing an operation executed by the fourth embodiment of the steering device according to the present invention during a secondary collision.

When the column pipe 1 twists during a secondary collision, the column pipe 1 inclines relative to the outer column 2 such that stress F is concentrated on the upper side of the inner peripheral surface of the embracing main body portion 21 of the outer column 2 and the connecting portion 25 (see FIG. 7). At this time, the stress concentrated on the upper rear side of the outer column 2 is dispersed by the inner peripheral recessed portions 5, 5A, 5B, while the stress F concentrated on the lower front side of the outer column 2 is dispersed by the escape portion 6 formed in the connecting portion 25. As a result, an impact on the column pipe 1 from the inner peripheral side surface of the outer column 2 can be alleviated, and an increase in an energy absorption load can be prevented.

Fifth Embodiment

Figure 8A:
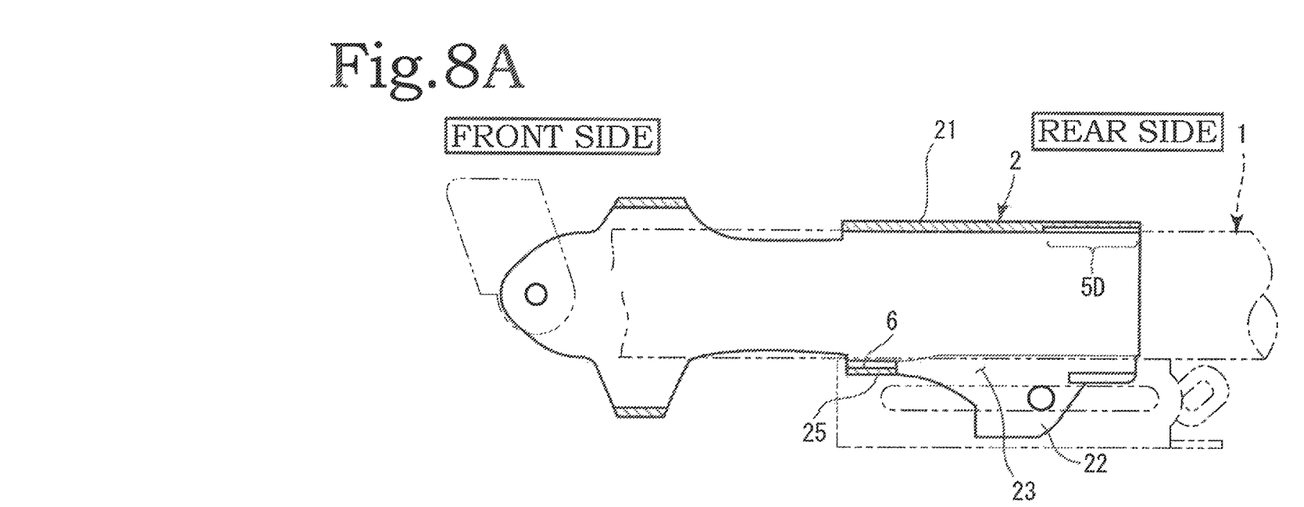
FIG. 8A is a longitudinal sectional side view of the outer column of a fifth embodiment of the steering device according to the present invention.

Next, referring to FIG. 8A, a fifth embodiment of the steering device according to the present invention will be described. In the fifth embodiment, an inner peripheral recessed portion 5D is formed in a rectilinear groove shape so as to extend from the axial direction (front-rear direction) rear end of the embracing main body portion 21 of the outer column 2 to a substantially intermediate location in the front-rear direction. The front-rear direction intermediate location of the embracing main body portion 21 of the outer column 2 covers a range including the center and the periphery thereof.

Sixth Embodiment

Figure 8B:
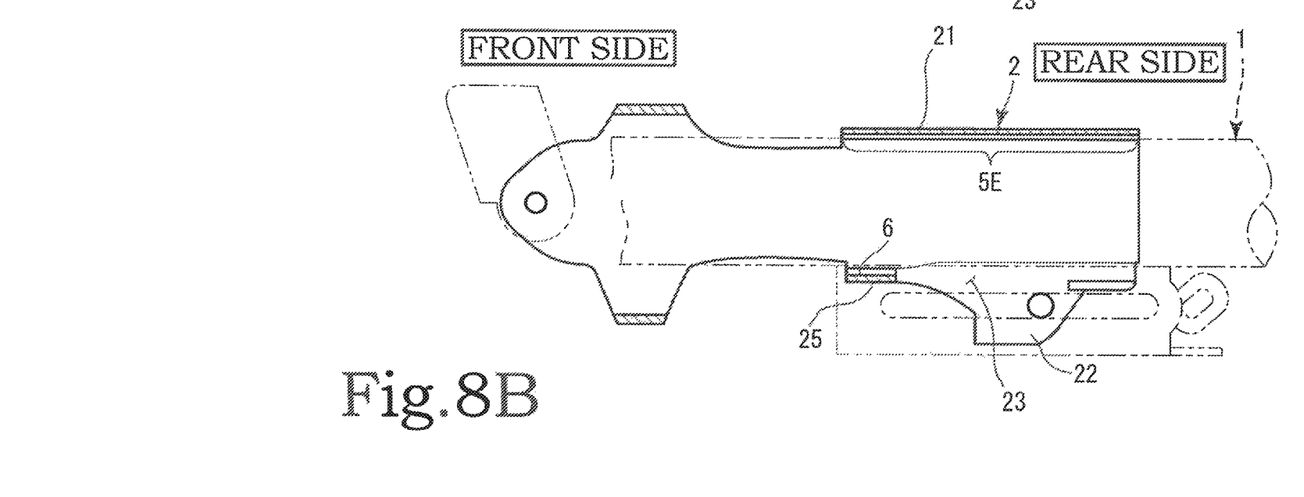
FIG. 8B is a longitudinal sectional side view of the outer column of a sixth embodiment of the steering device according to the present invention.

Next, referring to FIG. 8B, a sixth embodiment of the steering device according to the present invention will be described. In the sixth embodiment, an inner peripheral recessed portion 5E is formed in a rectilinear groove shape so as to extend fully along the axial direction (the front-rear direction) of the embracing main body portion 21 of the outer column 2 from the rear end to the front end.

An axial direction length and a circumferential direction width of the inner peripheral recessed portions 5, 5B, 5C, 5D, 5E described above are set appropriately in accordance with an angle at which the steering device is attached to the vehicle, the required energy absorption load, and so on. Further, in the present invention, the inner peripheral recessed portion 5 may be formed in a rectangular shape or a square shape (see FIG. 6A). Moreover, the formation region of the inner peripheral recessed portion 5 may be set to have a uniform thickness.

In the second embodiment, the inner peripheral recessed portion is formed in a region extending from the rear end of the embracing main body portion to the rear end of the clamp portion, and is formed in a trapezoidal shape such that the rear end thereof is wider than the front end. Hence, the contact area between the inner peripheral surface of the embracing main body portion and the column pipe can be maintained, and as a result, the initial load generated during a secondary collision can be reduced without impairing the tightening holding force. In the third embodiment, the inner peripheral recessed portion is formed in the shape of a bell having curved contour lines, and can therefore be extracted easily from a mold during manufacture. In the fourth embodiment, the inner peripheral recessed portion is thick at the front end, and thin only in a limited part at the rear end. Therefore, the contact area between the inner peripheral surface of the embracing main body portion and the column pipe can be maintained without impairing the tightening holding force. Moreover, the rear end of the inner peripheral recessed portion is cut away by being reduced in thickness, and therefore the initial load generated during a secondary collision can be reduced. Furthermore, the recessed portion can be extracted more easily from a mold during manufacture.

In the fifth embodiment, the inner peripheral recessed portion is formed to extend from the axial direction rear end of the outer column to a front-rear direction intermediate location, and therefore, when twisting occurs during a secondary collision, the stress that is concentrated on the upper side of the inner peripheral surface of the outer column can be dispersed over a wider range, with the result that the outer column and the column pipe can move forward smoothly. In the sixth embodiment, the inner peripheral recessed portion is formed to extend fully along the axial direction of the outer column from the rear end to the front end, and therefore, when twisting occurs during a secondary collision, the stress that is concentrated on the upper side of the inner peripheral surface of the outer column can be dispersed over an even wider range, with the result that the outer column and the column pipe can move forward smoothly. In a seventh embodiment, the escape portion is formed in the connecting portion formed to connect the respective ends of the slit portion in the outer column, and therefore stress generated during a secondary collision can be dispersed to the periphery likewise on the lower front side of the outer column. As a result, twisting of the column pipe can be prevented even more effectively.

What is claimed is:
1. A steering device comprising:
a column pipe for supporting a shaft;
an outer column;
a fixing bracket; and
a tightening tool, wherein
the outer column includes an embracing main body portion that holds the column pipe so that the column pipe can move in a front-rear direction, and clamp portions for widening and narrowing a slit formed in the embracing main body portion in a width direction;

the fixing bracket includes fixing side portions that clamp respective width direction sides of the outer column;

the tightening tool includes a clamping bolt and a clamping lever, the clamping bolt being inserted into a tightening hole formed in each of the clamp portions of the outer column and a support hole formed in each of the fixing side portions so that tightening and release can be performed freely using the clamping lever; and an inner peripheral recessed portion constituted by a recess-shaped cutout extending from a rear end of the embracing main body portion is formed on an inner peripheral side of an opposite side of the embracing main body portion to the slit.

2. The steering device according to claim 1, wherein the inner peripheral recessed portion is formed to the rear of respective rear ends of the clamp portions, and a rear end of the inner peripheral recessed portion is formed to be wider than a front end thereof.

3. The steering device according to claim 2, wherein a contour line forming a boundary between an inner surface of the embracing main body portion and the inner peripheral recessed portion is formed as a curve.

4. The steering device according to claim 2, wherein a thickness of the embracing main body portion within a region of the inner peripheral recessed portion is set to decrease gradually from a front side toward a rear side.

5. The steering device according to claim 2, wherein the inner peripheral recessed portion is formed to extend from an axial direction rear end of the outer column to an intermediate location.

6. The steering device according to claim 2, wherein the inner peripheral recessed portion is formed to extend fully along an axial direction of the outer column from a rear end to a front end.

7. The steering device according to claim 2, wherein a connecting portion that connects respective ends of the slit is formed on a front side of the slit, and an escape portion is formed on an inner peripheral side of the connecting portion.

8. The steering device according to claim 1, wherein a contour line forming a boundary between an inner surface of the embracing main body portion and the inner peripheral recessed portion is formed as a curve.

9. The steering device according to claim 1, wherein a thickness of the embracing main body portion within a region of the inner peripheral recessed portion is set to decrease gradually from a front side toward a rear side.

10. The steering device according to claim 1, wherein the inner peripheral recessed portion is formed to extend from an axial direction rear end of the outer column to an intermediate location.

11. The steering device according to claim 1, wherein the inner peripheral recessed portion is formed to extend fully along an axial direction of the outer column from a rear end to a front end.

12. The steering device according to claim 1, wherein a connecting portion that connects respective ends of the slit is formed on a front side of the slit, and an escape portion is formed on an inner peripheral side of the connecting portion.

13. A steering device comprising:

a column pipe for supporting a shaft;

an outer column;

a fixing bracket; and a tightening tool, wherein the outer column includes an embracing main body portion that holds the column pipe so that the column pipe can move in a front-rear direction, and clamp portions for widening and narrowing a slit formed in the embracing main body portion in a width direction;

the fixing bracket includes fixing side portions that clamp respective width direction sides of the outer column;

the tightening tool includes a clamping bolt and a clamping lever, the clamping bolt being inserted into a tightening hole formed in each of the clamp portions of the outer column and a support hole formed in each of the fixing side portions so that tightening and release can be performed freely using the clamping lever; and an inner peripheral recessed portion is formed on an inner peripheral side of the embracing main body portion opposite the slit so as to extend from a rear end of the embracing main body, wherein the inner peripheral recessed portion is formed to the rear of respective rear ends of the clamp portions, and a rear end of the inner peripheral recessed portion is formed to be wider than a front end thereof.

* * * * *